United States Patent [19]
Fordyce

[11] 3,780,999
[45] Dec. 25, 1973

[54] RIBBED FAN AIRFLOW STACK FOR WATER COOLING TOWER

[75] Inventor: Homer E. Fordyce, Kansas City, Mo.

[73] Assignee: The Marley Company, Mission, Kans.

[22] Filed: Feb. 9, 1971

[21] Appl. No.: 113,857

[52] U.S. Cl.............. 261/109, 261/DIG. 11, 52/80
[51] Int. Cl............................................. B01f 3/04
[58] Field of Search..............261/108-112, DIG. 11; 52/80, 236, 245, 218, 605

[56] References Cited
UNITED STATES PATENTS

| | | | |
|---|---|---|---|
| 2,387,969 | 10/1945 | Albrecht | 52/245 X |
| 2,571,753 | 10/1951 | Pennington | 52/245 X |
| 2,814,435 | 11/1957 | Fordyce | 261/DIG. 11 |
| 3,372,396 | 3/1918 | Braccini | 52/80 X |
| 3,618,277 | 11/1971 | Waters | 52/236 X |
| 3,648,990 | 3/1972 | Storen | 261/109 X |
| 1,497,141 | 6/1924 | Hart | 52/602 X |
| 2,357,705 | 9/1944 | Thorne | 52/218 X |

FOREIGN PATENTS OR APPLICATIONS

| | | | |
|---|---|---|---|
| 329,715 | 5/1930 | Great Britain | 261/DIG. 11 |

*Primary Examiner*—Robert Halper
*Attorney*—Schmidt, Johnson, Hovey & Williams

[57] ABSTRACT

A venturi-like airflow stack for induced draft water cooling towers employs a series of elongated, upright, longitudinally curved and transversely arcuate stave-like panels joined together by a series of releasable interconnections at their butt joints to form the wall of the stack. Each panel is provided with an external hoop length at the zone of greatest internal restriction; and opposed upper and lower V-shaped ribs having apexes which meet at a common junction with the respective hoop lengths. The hoop lengths and ribs are tubular in nature and are integral with the panels. Each hoop length is releasably coupled with its adjacent length and each leg of the upper ribs is releasably coupled with the proximal leg of the next adjacent panel for strengthening the wall and holding it against distortion.

7 Claims, 7 Drawing Figures

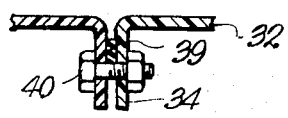
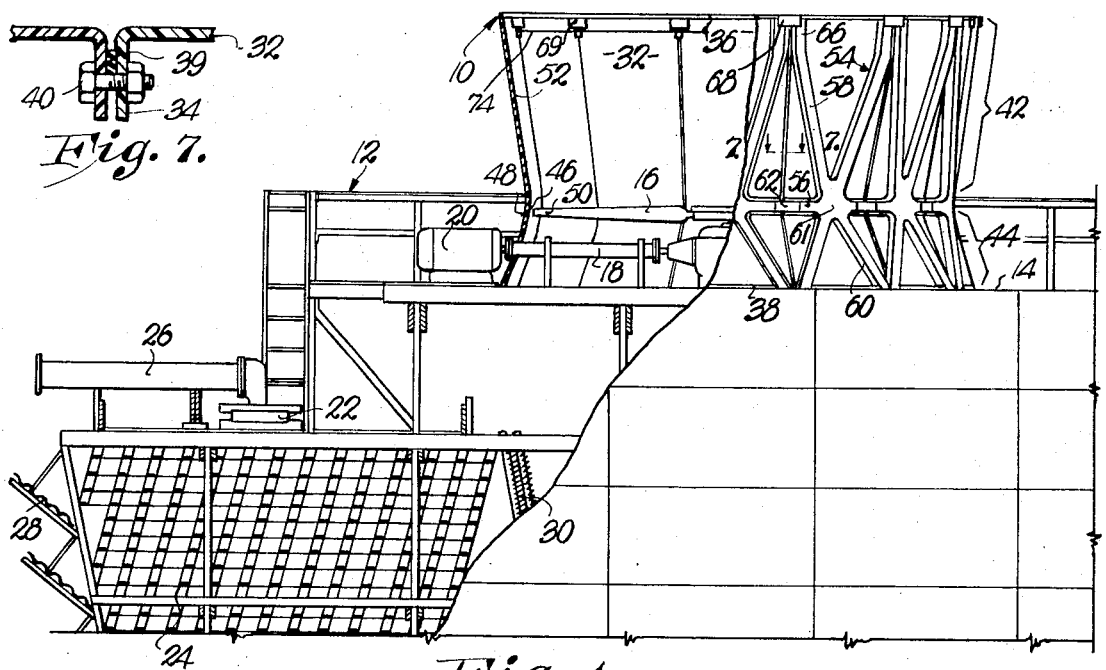

RIBBED FAN AIRFLOW STACK FOR WATER COOLING TOWER

This invention relates to the field of water cooling towers and, more particularly, to a ribbed fan airflow stack of the type usually constructed of a strong, corrosion resistant material such as glass reinforced synthetic resin and comprising a series of rectangular, intercoupled stave-like panels each having X-shaped external rib structure cooperable with releasably interconnected hoop defining rib lengths extending around the assembled stack to strengthen the latter and hold it against distortion under high wind loads or the like.

Water cooling towers are conventionally provided with fan cylinder stacks for discharging and guiding the hot exhaust air to a position above the tower where it diffuses into the ambient atmosphere and is carried away from the cool air inlet of the tower by the prevailing wind. It is necessary to discharge such moist hot air at an elevation where cycling of the hot exhaust air back through the cool air inlet of the tower is prevented since this would lower the cooling efficiency of the tower.

The motive force for pulling the air through the tower and propelling the hot exhaust air to a sufficient distance away from the tower is usually provided by an induced draft fan located within the stack. In addition, the stack is preferably provided with an eased air inlet leading to an internal, venturi-like restriction in which the fan operates and a divergent discharge section in which the reduction in air velocity results in a partial recovery of pressure. Maximum efficiency of the fan and fan stack however, is achieved only when the blade tips are positioned in close proximity to the internal surface of the stack at a position corresponding to the point of maximum restriction. The close proximity of the blade with the wall of the stack requires that the stack be constructed of material having sufficient structural strength and rigidity to withstand the external pressures exerted by the prevailing wind currents and the negative internal air pressure resulting from the venturi-like restriction. In this regard, it may be appreciated that if the stack were to bend or flex under the influence of external wind currents, severe damage to the stack wall, fan, and other related components could result from the striking of the fan blade tip against the wall of the stack.

Fan stacks having a venturi-like configuration described above have long been constructed of redwood or other treated wood. Wood stacks, however, while generally providing sufficient structural strength and rigidity to withstand the stresses of the internal airflow and external wind currents, offer a limited resistance to the weathering effects of the water and humidity present within the cylinders. Even redwood constructed stacks lose their resistance to deterioration in time and succumb to the adverse effects of the water. In addition, wood stacks In extremely costly in time to construct and cannot readily be constructed to the desired degree of accuracy or to the exact inlet shape for best fan performance.

A newer type of fan cylinder stack constructed of lightweight material such as fiber glass reinforced polyester synthetic resin has been used in a number of applicatons to overcome the cost drawbacks of the wood stacks, such as construction labor costs, weathering and limitations in degree of accuracy and in inlet shape. The thin-walled polyester stacks, however, present a major problem of their own—they fail to provide the necessary structural strength and rigidity to withstand high intensity stresses and wind loads thereon. in an attempt to overcome this problem, reinforcing structure in the nature of a plurality of vertically extending ribs have been added to the outer walls of the polyester stacks. This approach, however, provided only a limited amount of additional strength to the wall of the stack. In fact, none of the synthetic resin stacks heretofore used provided enough rigidity and stability to successfully withstand the wind loads and stresses of the type and magnitude that may be encountered in a full range of applications including those wherein the velocity of the wind currents may reach gale proportions or larger.

Accordingly, it is an important object of the present invention to provide a lightweight and corrosion-free airflow stack of the glass reinfoced synthetic resin type having external X-shaped ribs and horizontal hoop lengths which rigidify the stack structure to an extent that it may be used in a full range of applications including locations where the stack is likely to be subjected to extremely large externally applied wind loads.

A further important object of the invention is to provide a tubular, sectional airflow stack for an induced draft cooling tower wherein the stack is of reduced diameter intermediate the ends thereof to present a venturi passage therethrough with each section of the stack having opposed, upper and lower V-shaped ribs thereon with the apexes of the V-ribs being located at the narrowest part of the stack and cooperable with releasably interconnected rib lengths extending around the narrow diameter of the stack to define a rib pattern on the stack which minimizes significant deflection or distortion of the stack under heavy wind loads by virtue of the fact that the ribs are uniquely positioned in triangular and hoop defining relationships such that significant deformation thereof is precluded regardless of the direction in which such wind loads are imposed on the stack.

In the drawing:

FIG. 1 is a fragmentary, side elevational view of an induced draft water cooling tower provided with a ribbed airflow stack embodying the principles of the present invention, with portions of the tower being broken away and in section to illustrate the internal components of the tower;

FIG. 2 is a top plan view of the stack per se illustrating spider apparatus used to stabilize the stack and help maintain its concentricity;

FIG. 3 is an enlarged, detailed, fragmentary, sectional view of the outside of an upper edge portion of two panels making up the stack and illustrating details of the coupling between the panels;

FIG. 4 is a fragmentary, cross-sectional view taken along line 4—4 of FIG.3;

FIG. 5 is an enlarged, detailed, fragmentary, sectional view of the outside of two panels of the stack and showing the coupling between adjacent rib lengths defining a hoop around the stack;

FIG. 6 is a cross-sectional view taken along line 6—6 of FIG. 5; and

FIG. 7 is a further enlarged fragmentary, sectional view illustrating the butt joint between adjacent panels of the stack.

The fan airflow stack 10 of this invention is especially adapted for use on a water cooling tower such as the induced draft, double air inlet, crossflow tower shown in FIG. 1 of the drawing for illustrative purposes only and broadly numerated 12. Airflow stack 10 is normally carried at the top of the tower casing 14 with the axis thereof in vertical disposition. A crossflow tower such as unit 12 is conventionally provided with a fan 16 mounted on the tower frame structure within stack 10 and coupled by a drive line 18 to a fan drive motor 20 located outside of the stack 10. Hot water distribution basin 22 mounted on the supporting frame structure of tower 12 is disposed in overlying relationship to a fill assembly 24 which receives water from basin 22 supplied by hot water conduit 26. Louver structure 28 extending across each air inlet face of casing 14 at opposite sides thereof is in proximal, generally parallel relationship to respective fill assemblies 24. A drift eliminator 30 mounted adjacent the inwardly facing side of each assembly 24 removes entrained water from the moist air leaving respective fills prior to discharge of the air through stack 10.

Stack 10 includes a series of elongated, identical, rectangular, longitudinally curved and transversely arcuate, stave-like panels 32 each having a pair of side flanges 34, a top flange or lip 36, and a lower flange or foot 38, all of which are in dispositions projecting away from the main body portion of the panel. Panels 32 are preferably constructed of glass reinforced polyester or other suitable synthetic resin and are fabricated by conventional lay-up or other equivalent forming procedures. Panels 32 are quickly coupled together at their respective flanges 34 as shown in FIG. 7, by a plurality of fasteners 40 provided at spaced intervals along the lengths of flanges 34. An elongated strip 39 of sealing material introduced either before or after assembly of panels 32 extends the entire length of the latter and is positioned in sandwiched relationship between respective flanges 34 in a position inwardly of the line of fasteners 40. Strips 39 effectively isolate the inner surface 52 from the outer surface of stack 10 and thus prevent leakage of hot exhaust air through the joints between the panels above the fan which may, particularly in cold weather, result in condensation of moisture outside the stack with hazardous ice forming under freezing conditions. Similarly, the seal between joints of the lower sections of the panels prevents run-out and freezing of moisture which may collect on the inside surfaces of the stack.

Each panel 32 has an upper wall section 42 which is of greater length and at an angle with respect to the lower wall section 44 thereof whereby the panels cooperate to present a venturi passage when the panels are in assembled, stack defining relationship as shown in FIG. 1. The zone of maximum constriction within stack 10 indicated by the numeral 46, corresponds to a depression 48 around the outer surface stack 10 which, in turn, is defined by the merging portions of wall sections 42 and 44 of panels 32. Fan 16 is preferably mounted in disposition such that the blades 50 are aligned with the zone of maximum restriction 46 with the blade tips being positioned in close proximity to the inner surface 52 of stack 10.

Each panel 32 is provided with tubular rib structure 54 on the external surface of panel 32 and integral with the latter for holding the stack 10 formed therefrom against distortion. The rib structure 54 includes a hoop length 56 horizontally disposed on each panel 32 at depression 48 and upper and lower opposed V-shaped ribs 58 and 60 respectively. Rib 58 extends the length of each upper wall section 42 while rib 60 extends the length of a corresponding lower wall section 44. The apexes of ribs 58 and 60 meet along depression 48 in a common point of junction 61 with the respective hoop length 56. It should be noted that ribs 58 and 60 as well as hoop lengths 56 have inclined side surfaces, as illustrated in FIGS. 3, 5 and 6, which enable the panels 32 to be quickly and easily removed from the molding equipment after completion of the forming process. The ribs are all of tubular nature to increase the strength thereof without unduly adding to the weight of the stack assembly and this is preferably accomplished by use of cardboard spacers or equivalent devices which are laid in spanning relationship across each premolded hoop and rib of panel 32 while the main portion thereof is supported by a mold unit whereupon additional resin and glass are applied to the panel in overlying, covering relationship to the cardboard spacers.

The respective hoop lengths 56 of the various panels 32 are releasably coupled together in the manner indicated in FIGS. 5 and 6 by a plurality of outer plates 62 and fasteners 64. A series of inner coupling plates 63 and fasteners 65, releasably joining respective panels 32, are provided on the inner surface 52 at positions in substantially direct opposition to plates 62. The adjacent upper leg portions 66 of the respective upper ribs 58 are releasably coupled together by a plurality of outer, top coupling plates 68 and fasteners 70. A similar number of inner, top coupling plates 69 and fasteners 71, releasably interconnecting respective panels 32, are provided on the inner surface 52 of stack 10 and slightly below the outer plates 68.

The X and hoop defining ribs on each panel 32 are uniquely cooperable and interconnected upon assembly of stack 10 from a series of panels 32 to impart unusual strength to the stack against deformation under wind loads thereon in comparison with a stack of similar configuration and constructed of the same type of material at the same thickness as used in fabrication of panels 32. This is attributable to the fact that the crossed ribs of each adjacent pair of X-defining ribs lie along lines which approach tangential relationship to the circumferential curvature of the stack in directions extending from one end of the stack to the other end thereof and are almost linear in respective directions. As a result the stack panels are supported by triangles which are positioned such that their bases alternate between the minimum diameter zone 46 of the stack and respective upper and lower margins of the stack, lie in the three-dimensional curvature of the stack panels, and have their outer apexes fixed against significant movement by virtue of the fact that the lower margin of stack 10 is connected to the tower framework, while the upper ends are along a circular reinforced flange extending around the circumference of the stack.

Additional structural support for the upper margin of stack 10 and therefor the upper triangle defining ribs is provided by the spider apparatus 72 which serves to prevent the outward bending of the top portion of stack 10 into noncircular form. Apparatus 72 includes a plurality of cables 74 each coupled with a central plate member 76 and to a respective U-bolt 78 which extends through the wall of stack 10 between the various panels 32. The flanges 34 adjacent U-bolt 78 are outwardly flared in order to permit the shank portions of bolt 78 to freely pass through the joint between panels 32. A channel-shaped bracket 80 is positioned over the edges of the flared portion of flanges 34 and is used as a stop surface for nuts 82 which are threaded on U-bolt 78 for purposes of securing the latter to stack 10. A second pair of nuts 84, threaded on U-bolt 78 prior to the insertion of bolt 78 through the wall of stack 10, engage the inner surface 52 in order to achieve the proper height of bolt 78 relative to the inner surface 52 of stack 10.

The interconnected loop lengths 56 serve to strengthen the stack 10 at the important central depressed region 48 thereof where minimum deflection in response to maximum wind loads is essential to prevent contact between the fan blades and the stack.

The total result is a fan airflow stack for a water cooling tower having unusual strength to weight characteristics, particularly from the standpoint of resistance against distortion from wind loads thereon.

Having thus described the invention, what is claimed as new and desired to be secured by Letters Patent is:

1. An airflow stack for water cooling towers comprising:

an elongated, transversely circular, tubular wall having a vertical major axis, an upper open end, a lower open end, and a generally venturi-shaped configuration, presenting an upper and a lower wall section with an internal constriction intermediate said ends and a corresponding external depression around said wall, said wall including a plurality of releasably interconnected upright, stave-like panels spanning the distance between said ends and provided with interconnecting joints therebetween; and structure for holding said wall against distortion including: a series of essentially V-shaped ribs surrounding each of said panels, there being an upper and a lower V-shaped rib on each of said panels respectively, the apexes of said ribs being disposed adjacent said depression, and a hoop surrounding the wall at said depression, there being a hoop length on each panel respectively, and releasable means interconnecting said hoop lengths.

2. An airflow stack as claimed in claim 1, there being a common junction on each panel respectively between said apexes and said hoop lengths.

3. An airflow stack as claimed in claim 1, said ribs and said hoop lengths being tubular and integral with the panels.

4. An airflow stack as claimed in claim 1, said ribs and said hoop lengths being polygonyl in cross-sectional configuration.

5. An airflow stack as claimed in claim 1, wherein said ribs are disposed to present an essentially X-shaped rib configuration crossing at said depression on each panel respectively, said hoop lengths having a pair of branches extending laterally in opposite directions at the zone of crossing.

6. An airflow stack as claimed in claim 5, wherein the upper ribs have a pair of legs terminating adjacent proximal joints at said upper end of the wall and the lower ribs have a pair of legs terminating adjacent proximal joints at said lower end of the wall, said legs and said branches are hollow, and integral with the panels.

7. An airflow stack as claimed in claim 1, said ribs being integral with the panels.

* * * * *